UNITED STATES PATENT OFFICE

FREDERICK C. LANGENBERG, OF EDGEWATER PARK, AND HORACE S. HUNT AND HERBERT G. REDDICK, OF BURLINGTON, NEW JERSEY, ASSIGNORS TO UNITED STATES PIPE AND FOUNDRY COMPANY, OF BURLINGTON, NEW JERSEY, A CORPORATION OF NEW JERSEY

HYDRAULIC CEMENT MORTAR AND METHOD OF COMPOUNDING THE SAME

No Drawing. Original application filed July 29, 1931, Serial No. 553,895. Divided and this application filed January 26, 1932. Serial No. 589,040.

Our invention relates to an hydraulic cement mortar of an improved quality and to the method of compounding such an improved mortar.

Hydraulic cement mortars and concretes as heretofore generally manufactured are found to incorporate considerable percentages of uncombined lime which is produced as a reaction product in the hydration and setting of cement and may in some cases be present in the cement before hydration. This uncombined lime is quite freely soluble in water and for this reason mortars embodying uncombined lime are undesirable as lining for pipes, tanks, or other containers designed as conduits or containers for water, and such mortars or concretes have also objectionable qualities for other uses because the elimination of lime by solution tends to make the mortar or concrete porous and impair its strength, and also because the carbonic acid in the air has a tendency to react with the lime, forming particles of carbonate of lime of larger size than the original particles of lime, the formation of which in a set concrete has a more or less disruptive effect.

The object of our invention is to provide a method of compounding an hydraulic cement mortar or concrete in which the free lime particles either present in the cement or produced as reaction products during the hydration and setting of the cement will be converted into practically insoluble lime salts which will form an unobjectionable component of the set mortar, such enlargement of the particles as may be due to the conversion of the lime to an insoluble lime salt being entirely unobjectionable because it occurs during the hydration and before the setting of the cement and therefore has no disruptive tendency. We have found that by mixing with the cement in the formation of a mortar a substance containing monocalcium silicate, preferably a finely ground blast furnace slag, it is possible to diminish the percentage of free lime in the resultant set mortar, the reaction being no doubt between the free lime incident to the hydration of the cement and the monocalcium silicate to form a dicalcium silicate but we have been unable to obtain a substantially complete elimination of the free lime in this way. By monocalcium silicate we mean the compound whose chemical formula is, CaO.• SiO$_2$. This compound is also sometimes described as calcium bisilicate and is, we believe, present in proper reactive quantities in practically all blast furnace slags. We have also found that by incorporating in the mortar during its preparation a water soluble acid non-reactive with the aluminate and silicate components of the cement but reactive with free lime to form an insoluble lime salt that here again it is possible to effect a diminution in the percentage of free lime which would otherwise be present in the set mortar, but here again we have found it impracticable by this expedient to form a mortar substantially free from free lime. We have discovered however that by mixing in the mortar both the finely ground blast furnace slag containing the monocalcium silicate and uncombined oxalic acid dissolved in the water used in compounding the mortar, that we can and do produce a set mortar or concrete in which substantially all of the free lime which would otherwise be incorporated in the mortar is converted into insoluble lime salts, with the result that a mortar or concrete is produced of exceptionally fine texture and strength, embodying practically no soluble elements and highly resistant to detrimental effects from exposure to water or air. This mortar is particularly valuable as a lining for water containers, such as pipes and tanks, owing to its freedom from soluble contaminating components and owing to its density and lack of porosity, and when applied centrifugally, as in the lining of pipes, or properly trowelled on its surface, it is more easy to produce on the surface a smooth, dense and repellant layer, which forms an additional protection against the permeation of the mortar by water.

Our invention consists in the described method of compounding such a mortar or concrete and in the wet mortar mixture produced by this method which in setting results in the production of a hydrated hydraulic cement mortar characterized in that its lime content is substantially all present in the form of insoluble compounds partly of insoluble compounds of the calcium with silicon and aluminum and partly in the insoluble compounds of the calcium with oxalic acid.

In practice, and for the best results, we compound our mortar by mixing with the hydraulic cement approximately 22 parts of finely ground blast furnace slag to 100 parts of cement, adding with and dissolved in the water approximately 1½ percent of uncombined oxalic acid, which acid is reactive with free lime to form an insoluble lime salt and non-reactive with the aluminates and silicates of the cement and of course aggregate materials suitable for making mortar or concrete of any desired kind are also to be added where desired; thus, in forming a mortar suitable for the centrifugal lining of pipes, we have incorporated in the mortar 30 parts of sand to the 100 pounds of cement.

We prefer, in compounding our mortar, to employ hydraulic cements containing a minimum quantity of soluble alkali compounds. This is particularly the case where the mortar is to be used as a lining for water receptacles but even where our mortar contains such soluble alkali compounds, its marked density and impermeability to water has a marked effect in preventing the dissolving out from the mortar of such alkali compounds as it may embody.

While the oxalic acid which we use in compounding our mortar undoubtedly combines with the free lime to produce an insoluble lime oxalate, it would seem not improbable that it may also act as a catalyzer for bringing about an increased formation of dicalcium silicate in a reaction between the monocalcium silicate and the lime liberated from the tricalcium silicate, or perhaps as a polarizer which may act to some extent in checking the reactions which bring about the formation of free lime in the mortar. It is however not important in exactly what way the acid functions, as it undoubtedly brings about in some way the desired condition in which the mortar is substantially free from uncombined lime.

We have, in our copending application filed July 29, 1931, Serial Number 553,895, described and claimed a method and mortar similar in all respects to that described and claimed in the present application except in that we use in compounding the mortar, phosphoric acid in the place of oxalic acid.

Having now described our invention, what we claim as new and desire to secure by Letters Patent, is:

1. The method of compounding a hydraulic cement mortar substantially free from uncombined lime which consists in mixing with the ingredients during the compounding of the mortar a substance rich in monocalcium silicate and in addition to such substance uncombined oxalic acid dissolved in the water used in compounding the mortar.

2. A hydraulic cement wet mortar mixture comprising hydraulic cement, a substance rich in monocalcium silicate, water and uncombined oxalic acid dissolved in the water component of the mixture.

FREDERICK C. LANGENBERG.
HORACE S. HUNT.
HERBERT G. REDDICK.